(12) United States Patent
Liao

(10) Patent No.: US 7,673,914 B2
(45) Date of Patent: Mar. 9, 2010

(54) AUTOMATIC ALERT DEVICE FOR SUCTION CUP

(75) Inventor: Po Lin Liao, Taichung (TW)

(73) Assignee: Lih Yann Industrial Co., Ltd., Taichung (TW)

( * ) Notice: Subject to any disclaimer, the term of this patent is extended or adjusted under 35 U.S.C. 154(b) by 234 days.

(21) Appl. No.: 12/005,269

(22) Filed: Dec. 27, 2007

(65) Prior Publication Data
US 2009/0166490 A1 Jul. 2, 2009

(51) Int. Cl.
*B25J 15/06* (2006.01)
(52) U.S. Cl. .................. 294/64.1; 294/907; 116/70
(58) Field of Classification Search ............. 294/64.1, 294/64.2, 64.3, 907; 414/627, 737; 116/68, 116/70
See application file for complete search history.

(56) References Cited

U.S. PATENT DOCUMENTS

| 4,466,764 A | * | 8/1984 | Hutter, III | 414/796.6 |
| 5,184,858 A | * | 2/1993 | Arai | 294/64.1 |
| 5,639,134 A | * | 6/1997 | Rusch et al. | 294/64.1 |
| 5,795,001 A | * | 8/1998 | Burke | 294/64.1 |

* cited by examiner

*Primary Examiner*—Dean J Kramer
(74) *Attorney, Agent, or Firm*—Muncy, Geissler, Olds & Lowe, PLLC

(57) ABSTRACT

An automatic alert device is provided for a suction cup, including a pump and a suction cup positionable on an object to be handled. The pump is operable to drive air out of the suction cup thereby inducing suction force on the object to be handled. When the suction cup gradually loses the suction force, a plunger of the pump gets moved out of the pump. When the outward movement of the plunger reaches a preset extent, the alert device that includes a warning light and an audio alert is activated to cause the warning light and the audio alert to give off warnings of light and sound respectively. Thus, an operator can be immediately notified of the situation of losing suction force for taking remedial operation to get the suction force back to the desired level.

5 Claims, 10 Drawing Sheets

AUTOMATIC ALERT DEVICE FOR SUCTION CUP

BACKGROUND OF THE INVENTION

1. Field of the Invention

The present invention relates to an alert device for a suction device, and in particular to an automatic alert device that generates warnings of light and sound to indicate an excessive reduction of suction force of the suction device.

2. The Related Arts

Suction devices are commonly known and widely used to handle objects having a flat and smooth surface. FIGS. 1 and 2 illustrate a conventional pump-contained suction device, wherein a pump for expelling air out of the suction device is integrated to the suction device. The pump can be horizontally arranged (FIG. 1), where the pump has an axis substantially parallel to the surface of the object to be handled; or alternatively, the pump can be vertically arranged (FIG. 2), where the axis of the pump is arranged perpendicular to the surface to be handled. Both types of pump comprise a plunger 11 reciprocally movable within the pump 10. The plunger 12 is forcibly moved into the pump 10 until reaching an inner end of the pump and such a movement expels air out of the suction device 12. The movement of the plunger 11 is reciprocal and repeated until the suction force induced by the suction device 12 reaches a desired level to firmly fix the suction device 12 to the surface to be handled. At this time, the plunger 11 is partially received in the pump 10 at a predetermined location. Conventionally, the plunger 11 is provided with a red reference line 13, which is hidden in the pump 10 with the plunger 11 partially received in the pump 10. When the suction force provided by the suction device 12 is reduced by a predetermined amount, the plunger 11 is moved out of the pump 10 to such an extent to expose the red line 13. This indicates an excessive reduction of the suction force and an operator has to re-operate the plunger 11 to increase the suction force to the original level. Thus, the operator must keep an eye on the plunger and the red line in order to ensure that the suction force is always maintained at the desired level during the course of operation. In case that the suction device stays outside the sight of the operator for a long time or is set at a raised position so that the operator cannot watch the red line from time to time, unexpected accidents may happen due to the lose of suction force of the suction device. The red line 13 apparently serves as an indication of insufficiency of suction force of the suction device.

In view of the above discussed drawback, it is desired to provide an automatic alert device that automatically gives of warnings at the time excessive reduction of suction force of a suction device occurs so as to overcome the conventional drawback.

SUMMARY OF THE INVENTION

For a conventional suction device that contains a pumping device, a plunger of the pumping device is reciprocally movable inside a cylinder to forces air out of the suction device thereby enabling the suction device to induce suction force on a surface of an object to be handled. When the object to be handled is held by the suction force, the plunger is set in a location that is partially received inside the pump. The conventional plunger is provided with a red reference line that is hidden in the pump when the plunger is set inside the pump. The suction device, after a lapse of time, loses its suction force and, during the course of gradually losing of the suction force, the plunger is gradually moved out of the pump to eventually expose the red line. This indicates that re-operation of the plunger to make the suction force of the suction device increased back to the original level is required. Consequently, an operator of the suction device has to keep an eye on the plunger to check if the red line is getting exposed. This is a troublesome job. Further, in case that the suction device is set a location far away from the operator, such as located at a raised position, or the operator has to leave for a long while, the red line can no longer be watched and accidents due to insufficiency of suction force may happen unexpectedly.

The present invention is aimed to solve the above addressed issue by providing an automatic alert device for a suction device. The suction device comprises a suction cup and a pump integrated with the suction cup. The suction cup is positionable on a surface of an objected to be handled and the pump is provided with a plunger that is manually operable to drive air out of the suction cup until interior of the suction cup reaches a desired vacuum level, which induces suction force on the object to be handled. With the lapse of time, the suction cup gradually its suction force and the plunger gets gradually out of the pump. In accordance with the present invention, when the suction force is getting reduced and the plunger is getting out of the pump, a sensor that was originally set in engagement with and thus de-activated by an actuation bar at the time when the suction cup maintains sufficient suction force is activated by disengaging from the actuation bar due to the outward movement of the plunger. The sensor then triggers a warning light and an audio alert to generate warnings of light and sound, which present an immediate notification to the operator of the insufficiency of the suction force provided by the suction device so that the operator can get immediately aware of the situation of insufficient suction force without constantly observing the red line. Thus, the present invention is easy to operate and is practical and safe.

The prior art requires constant observation of the plunger to check if the red line gets exposed in order to re-operate the suction device to maintain the desired level of suction force, and this indicates that once the plunger is not or cannot be constantly monitored and is set at a location far away from an operator, safety problem may unexpectedly occur due to the unattended exposure of the red line of the plunger. The present invention, on the contrary, is automatically operated in that the actuation bar is operatively coupled to the plunger so that when the insufficiency of suction force causes the plunger to get moving out of the pump, the actuation bar is also moved to trigger the sensor for immediately activating the alert device and warnings of light and sound are given off to notify the operator of the situation of insufficiency of suction force, which can then get timely attended by the operator to avoid potential safety problems.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 7:
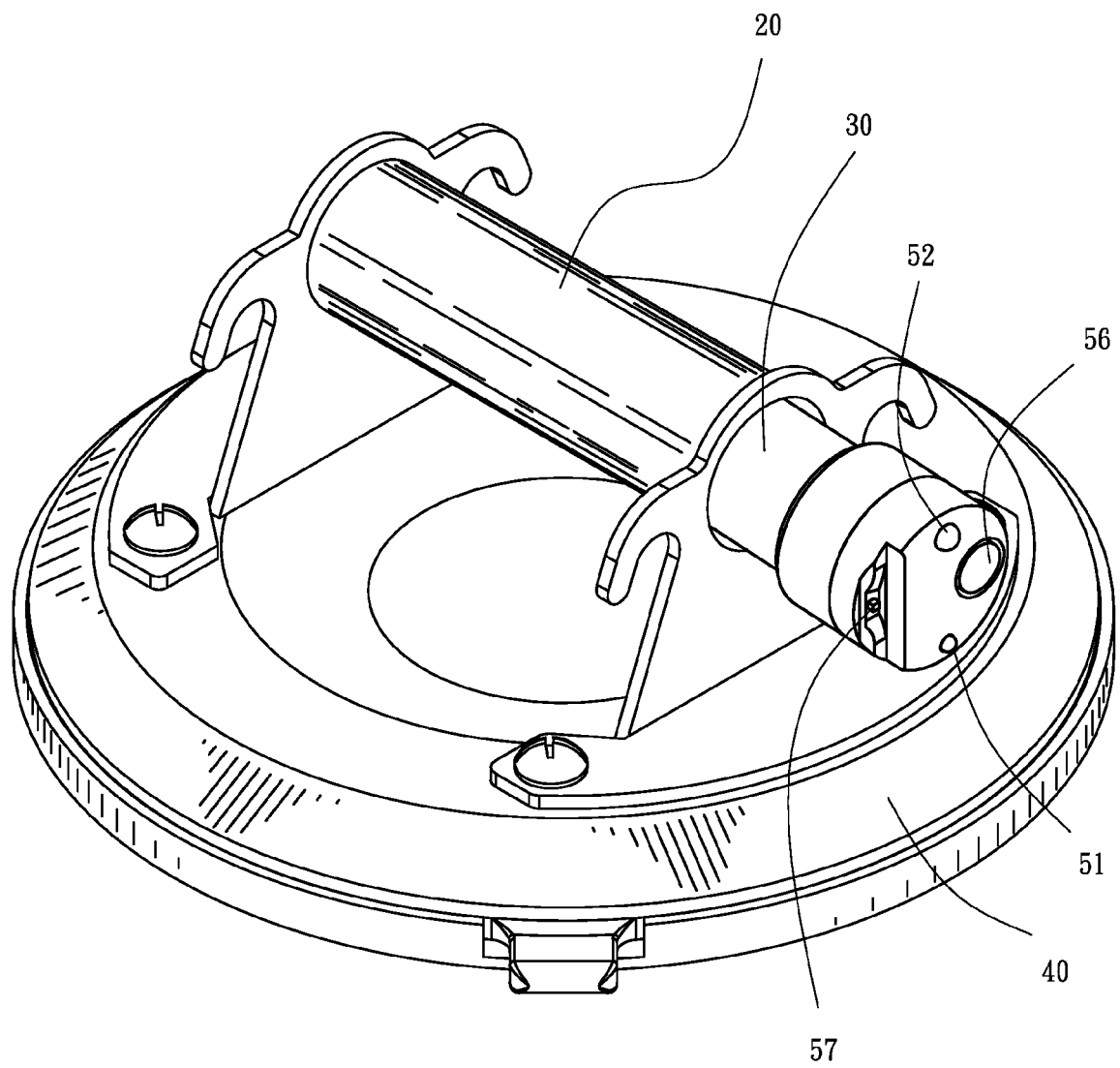
FIG. 7 is a perspective view illustrating the suction cup that contains the pumping device integrated with the alert device in accordance with an embodiment of the present invention.
Figure 8:
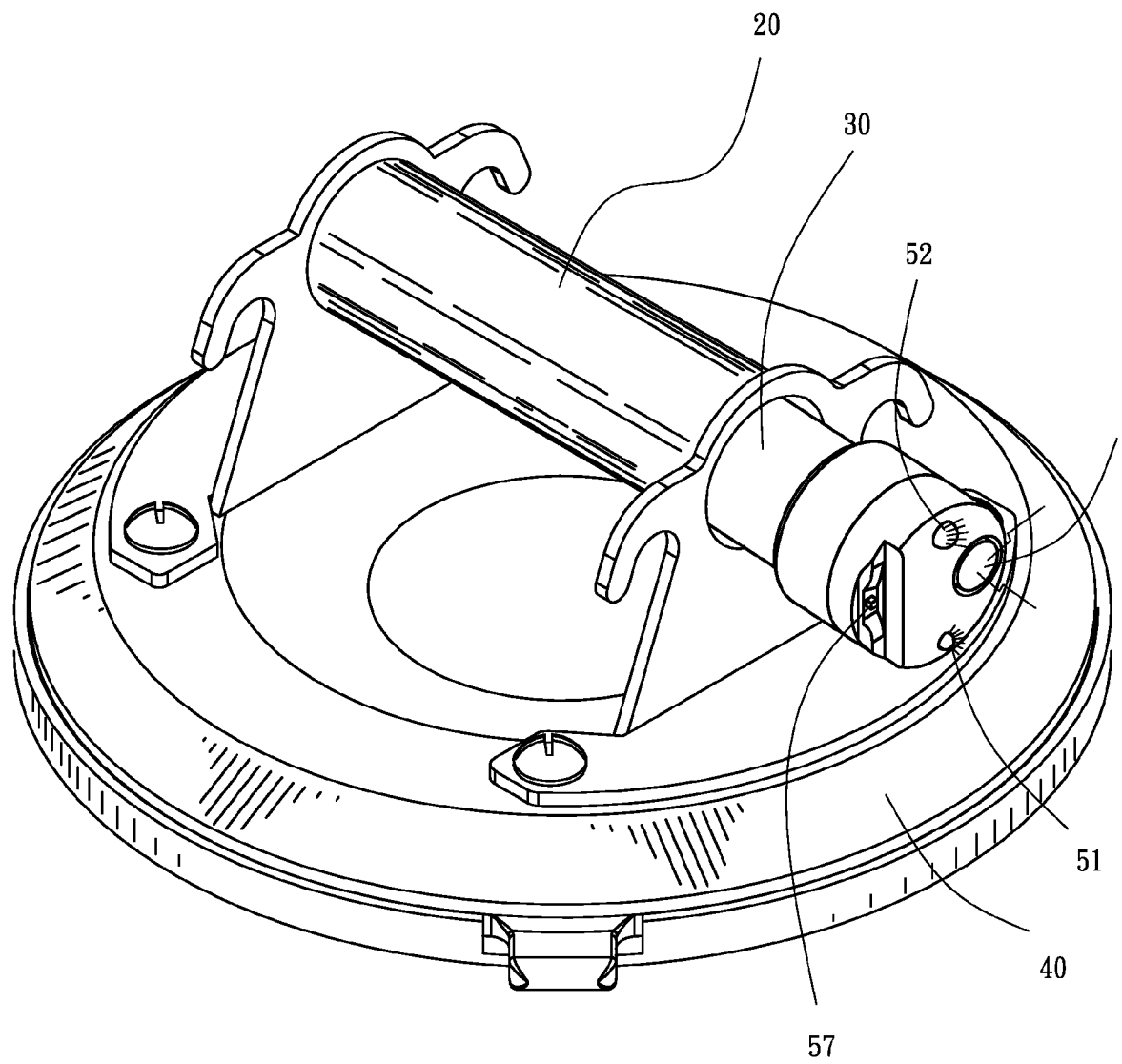
FIG. 8 is a perspective view similar to FIG. 7 illustrating the operation of the alert device.

With reference to the drawings and in particular to FIGS. 7 and 8, a suction cup, generally designated with reference numeral 40, in which an automatic alert device constructed in accordance with the present invention is embodied is. The suction cup 40 comprises a pumping device (or simply "pump") integrated therewith and the pump comprises a cylinder 20 in which a plunger 30 is movably received. The automatic alert device constructed in accordance with the present invention, generally designated with reference numeral 50, is formed on an outer end of the plunger 30 and is generally exposed outside the cylinder 20.

Figure 1:
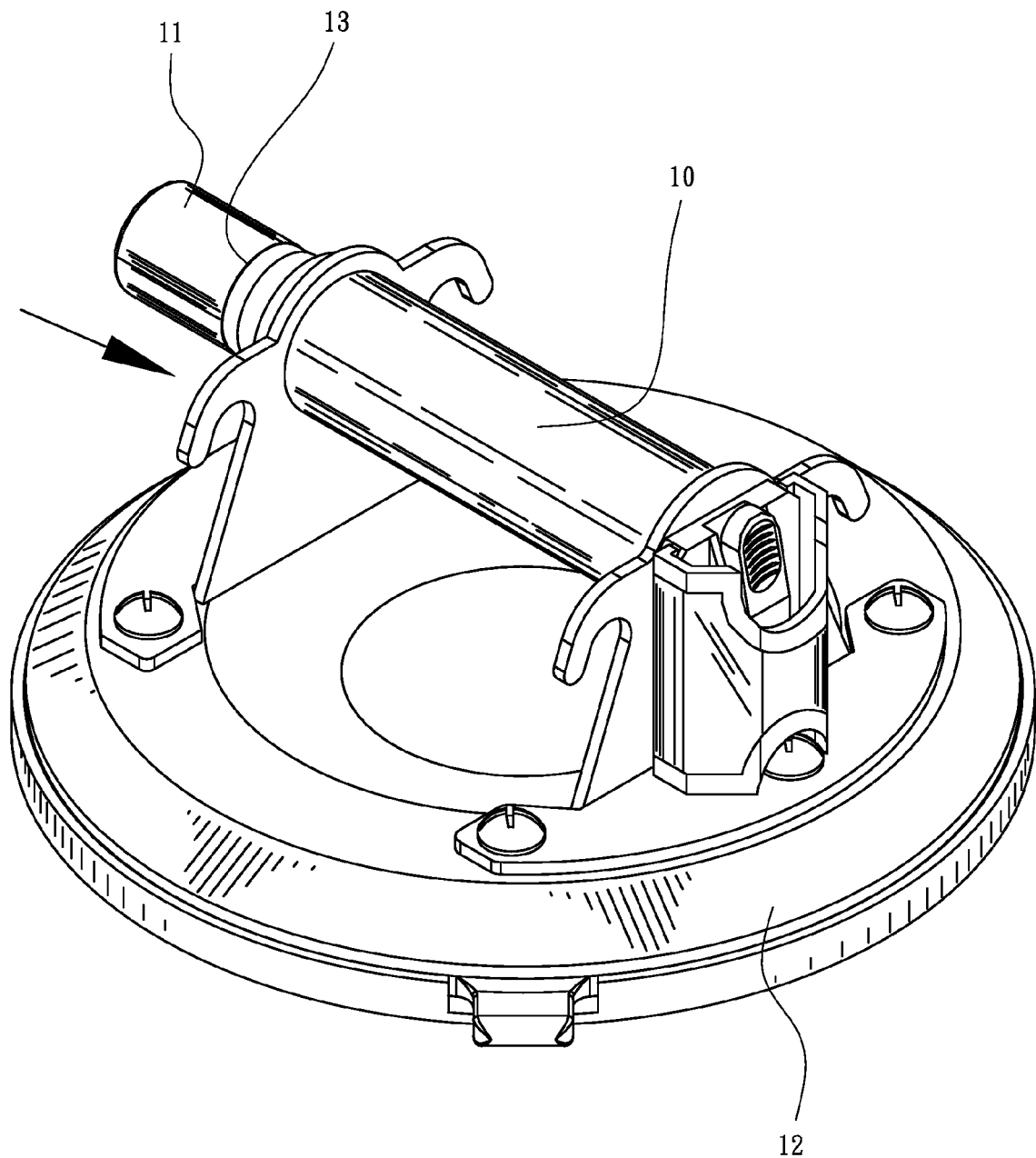
FIG. 1 is a perspective view showing a conventional suction device that contains a horizontally arranged pump.
Figure 2:
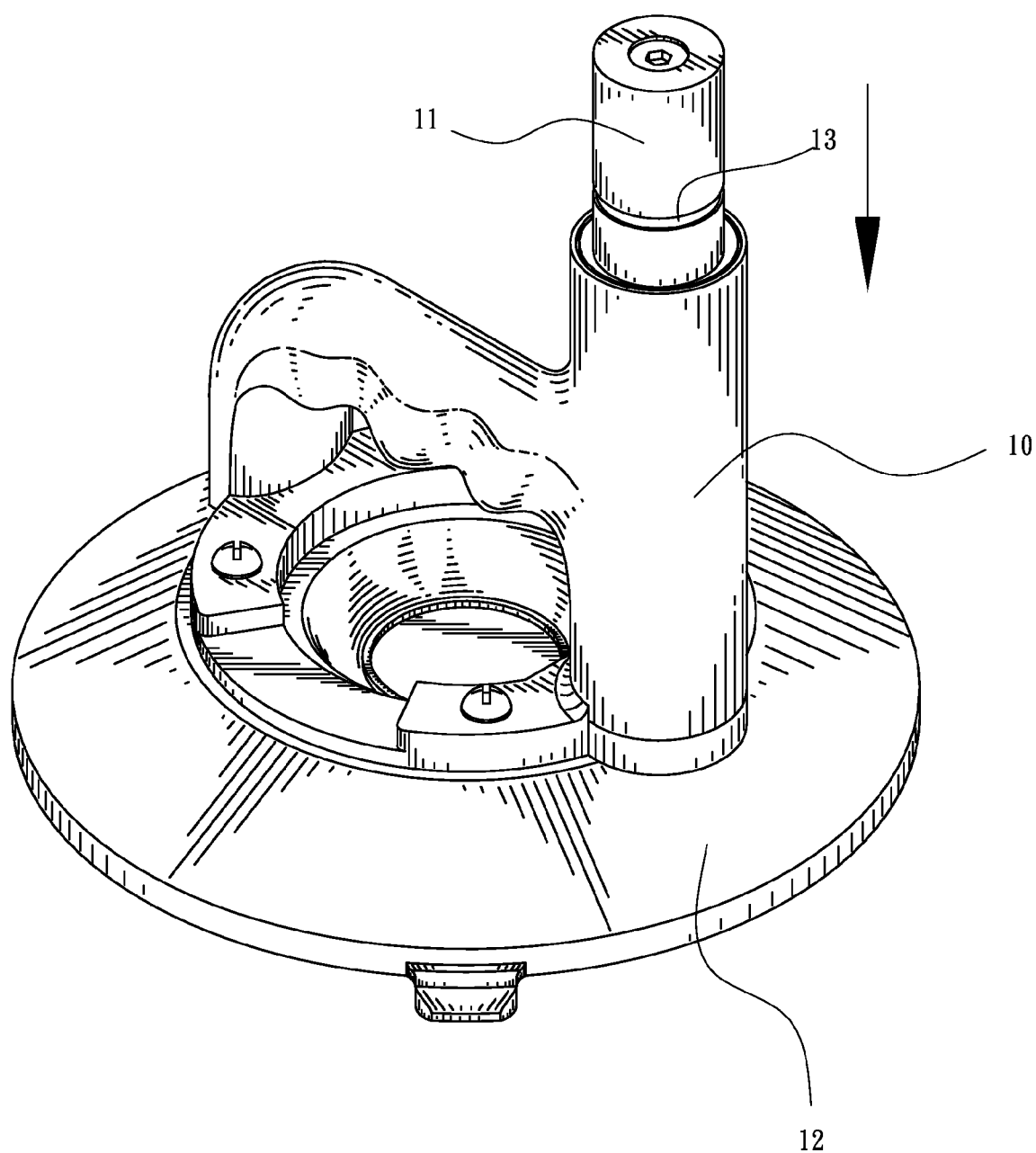
FIG. 2 is a perspective view showing a conventional suction device that contains a vertically arranged pump.
Figure 3:
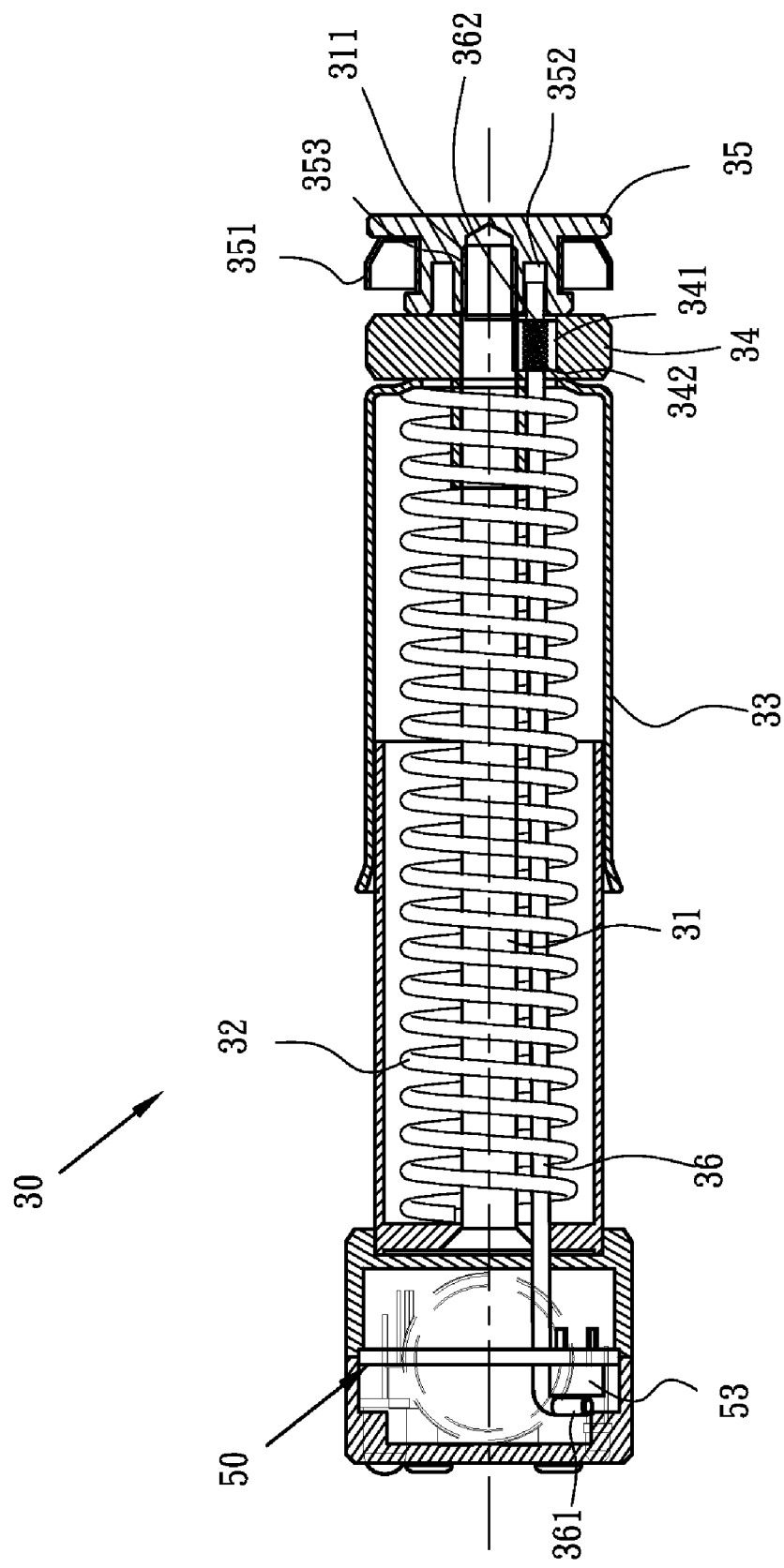
FIG. 3 is a cross-sectional view of a plunger for a pumping device integrated with a suction cup in accordance with the present invention.

Also referring to FIG. 3, which shows a cross-sectional view of the plunger 30, the plunger 30 to which the alert device 50 is mounted comprises a barrel 33 having an axially inner end opposite to the outer end that carries the alert device 50. Axially arranged in barrel 33 are a central rod 31 and a resilient element 32 having opposite ends engaging the inner end of the barrel 33 and the alert device 50 respectively. Preferably, an additional barrel (not labeled) is partially and telescopically received in an open end of the barrel 33 that is opposite to the closed inner end of the barrel 33 and forms a remote closed end serving as the outer end carrying the alert device 50. And, preferably the resilient element 32 comprises a helical spring encompassing the central rod 31.

A washer seat 34 is attached to the inner end of the plunger 30 and is thus fixed to the inner tube 33 of the plunger 30. The central rod 32 has an inner end slidably extending through a central bore (not labeled) of the washer seat 34 and forming threading 311 to threadingly engage an inner-threaded bore 353 formed in a rubber block carrier 35. The carrier 35 carries thereon a rubber block 351. Thus, the rubber block 351 is movable with the central rod 31.

An alert actuation bar 36 extends through the barrel 33 and has a remote or outer end 361 bent to engage a sensor 53 of the alert device 50 and an opposite inner end extending through a through hole 341 defined in the washer seat 34 and movably fit into a blind hole 352 defined in the rubber block carrier 35. The through hole 341 that is formed in the washer seat 34 is made up of a reduced section close to the barrel 33 and an expanded section away from the barrel 33 and adjacent to the rubber block carrier 35, whereby a step-like configuration is formed between the reduced section and the expanded section. The inner end of the actuation bar 36 also extends through a resilient element 342, preferably a helical spring received in the expanded section and is fixed to a clip ring 362 that is set opposite to the step and engageable with the rubber block carrier 35. Thus, for example when the suction cup 40 maintains sufficient suction force against an object to be fixed, the actuation bar 36 is biased by the resilient element 342 to have the bent end 361 normally engaging the sensor 53 for switching off the alert device 50.

Figure 4:
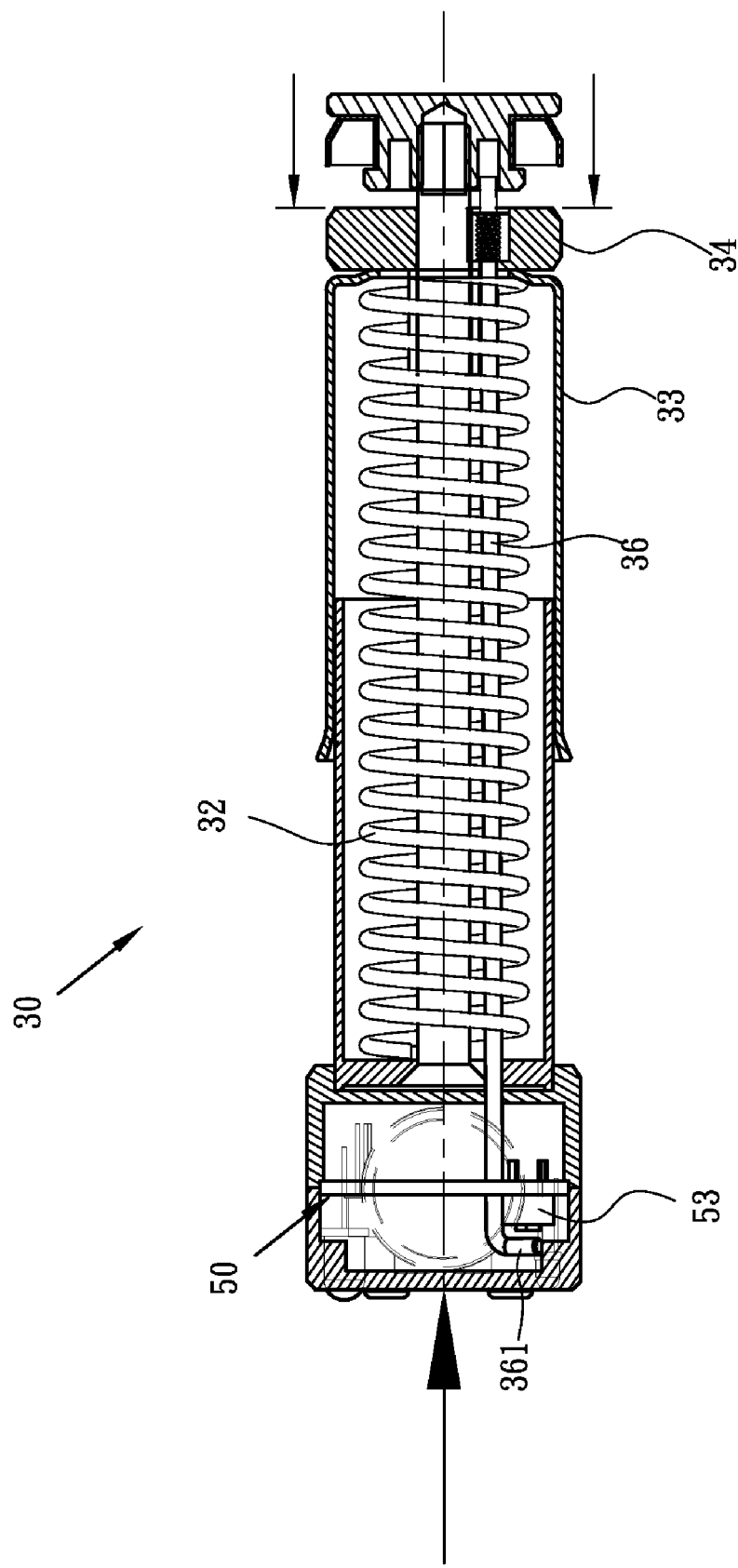
FIG. 4 is a cross-sectional view similar to FIG. 3 illustrating the operation of the plunger.
Figure 5:
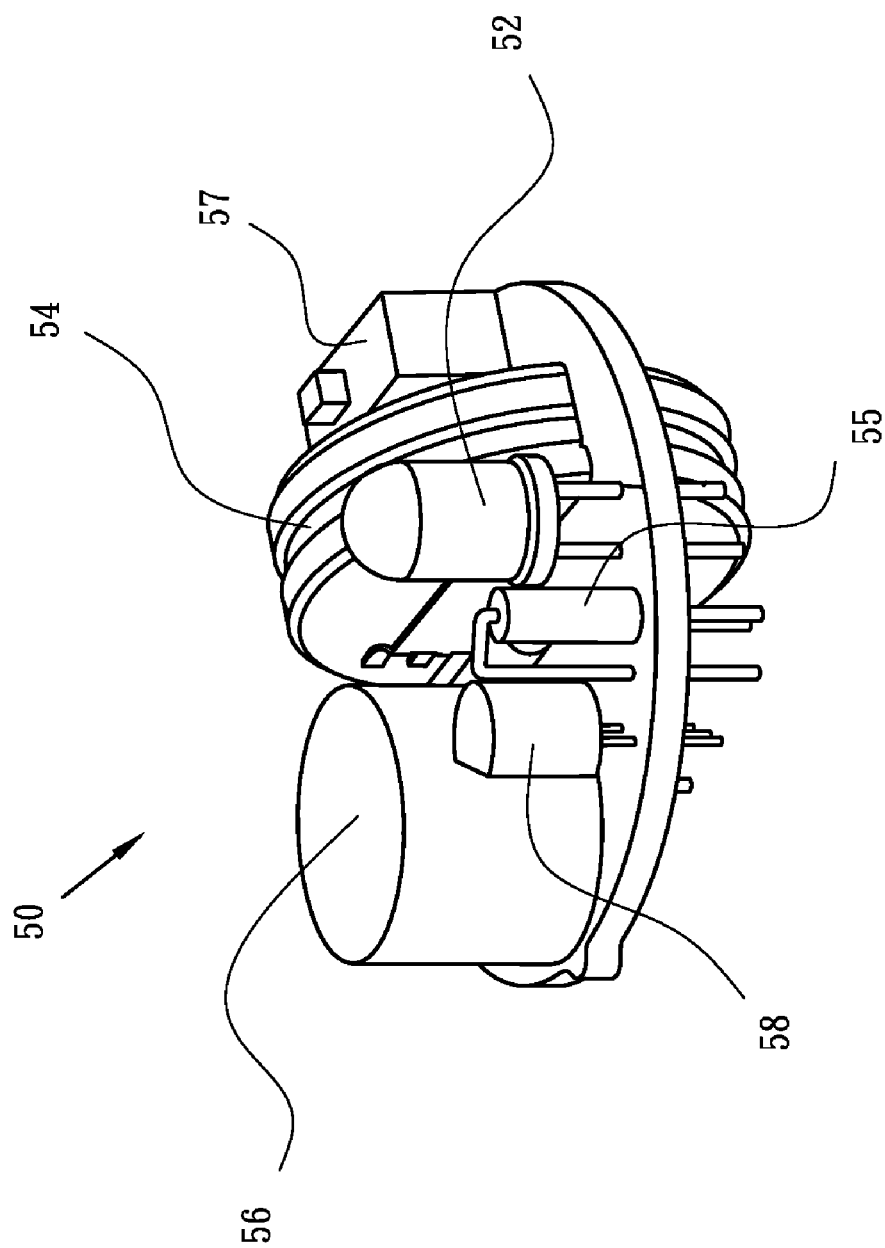
FIG. 5 is a perspective view illustrating an alert device, with an outer casing removed, that is mounted to the plunger of the present invention.
Figure 6:
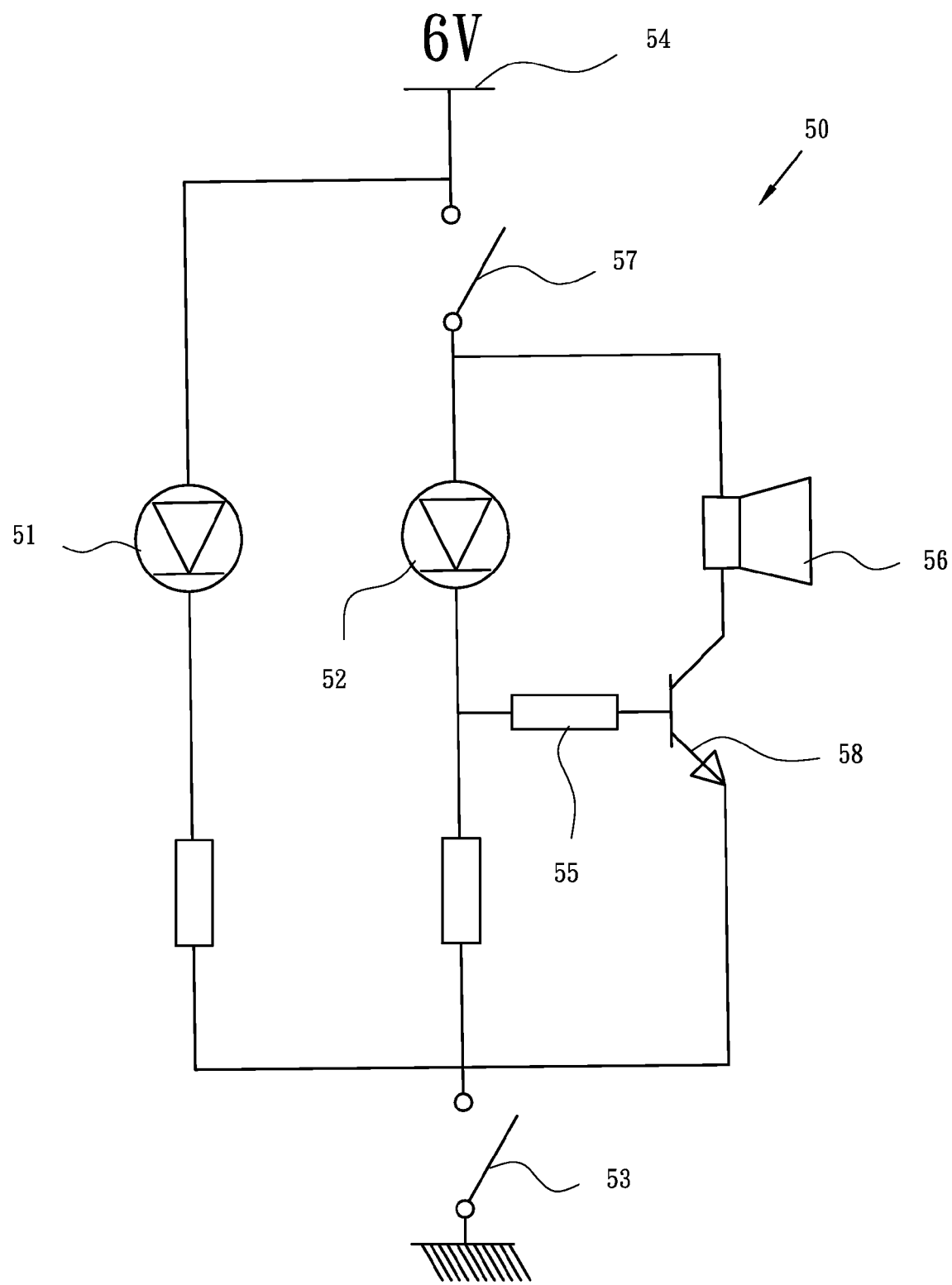
FIG. 6 is a circuit diagram of the alert device of the present invention.

Also referring to FIGS. 5 and 6, the alert device 50 comprises a circuit in which a battery set 54, an indicator 51, a warning light 52, an audio alert 56, resistors 55, the sensor 53, a shut-down switch 57, and a triode 58 are included. As mentioned above, the bent end 361 of the actuation bar 36 is normally set in engagement with the sensor 53 to de-activate the alert device 50. As demonstrated in FIG. 4, when the actuation bar 36 is moved due to for example internal pressure of the suction cup 40 changes, which makes the suction cup 40 non longer maintain a sufficient suction force, the bent end 361 disengages from the sensor 53, thereby activating the alert device 50 and the audio alert 56 and the warning light 52 issuing audio and lighting warnings, respectively. The shut-down switch 57 allows a user to shut down the alert device 50 by cutting off power supplied from the battery set 54 to the circuit.

It is noted that the indicator 51, the warning light 52 are both arranged at suitable locations on an outer surface of the alert device 50 for easy observation by a user. The audio alert 56 may also be exposed on the outer surface of the alert device as shown in the drawings, but it is not necessary to be so.

The operation of the suction cup 40 will be described with reference to FIGS. 4, 7, and 8. The suction cup 40 is first positioned on a surface of an object (not shown) to be handled and the plunger 30 is successively moved to the bottom of the cylinder 20 and retracted outward to expel air out of the suction cup 40 until a desired vacuum level inside the suction cup 40 is reached. At this time, the internal pressure of the suction cup 40 is reduced and the suction cup 40 is stably attached to the surface of the object to be handled by means of difference between the internal pressure and the atmosphere pressure, and the plunger 30 is partially kept inside the cylinder 20 at a predetermined position. After a lapse of time, due to air leakage or other factors, the suction force produced by the suction cup 40 gradually decreases, making the plunger 30 no longer maintaining in the predetermined position inside the cylinder 20, and the bent end 361 of the actuation bar 36 is allowed to disengage from the sensor 53 of the alert device 50, thereby activating the warning light 52 to give off light and audio alert 56 generating alert sound. More particularly, when the suction force is gradually reduced, the pressure acting on the washer seat 34 and the barrel 33 becomes sufficient to cause deformation of the resilient element 32 to disengage the bent end 361 of the actuation bar 36 from the sensor 53 of the alter device 50 so that the warning light 52 lights and the audio alert 56 sounds, as demonstrated in FIG. 8.

Figure 9:
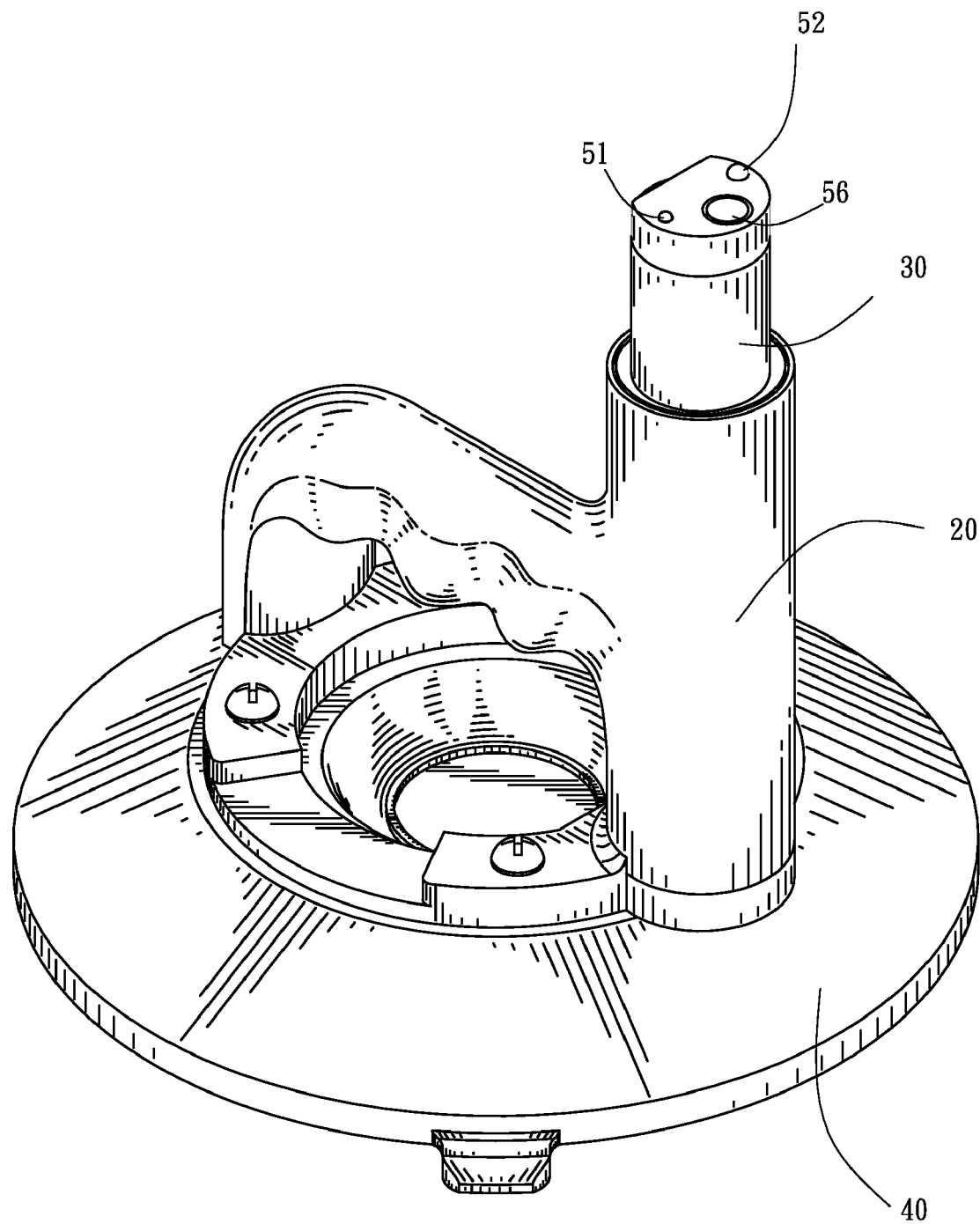
FIG. 9 is a perspective view illustrating the suction cup that contains the pumping device integrated with the alert device in accordance with another embodiment of the present invention.
Figure 10:
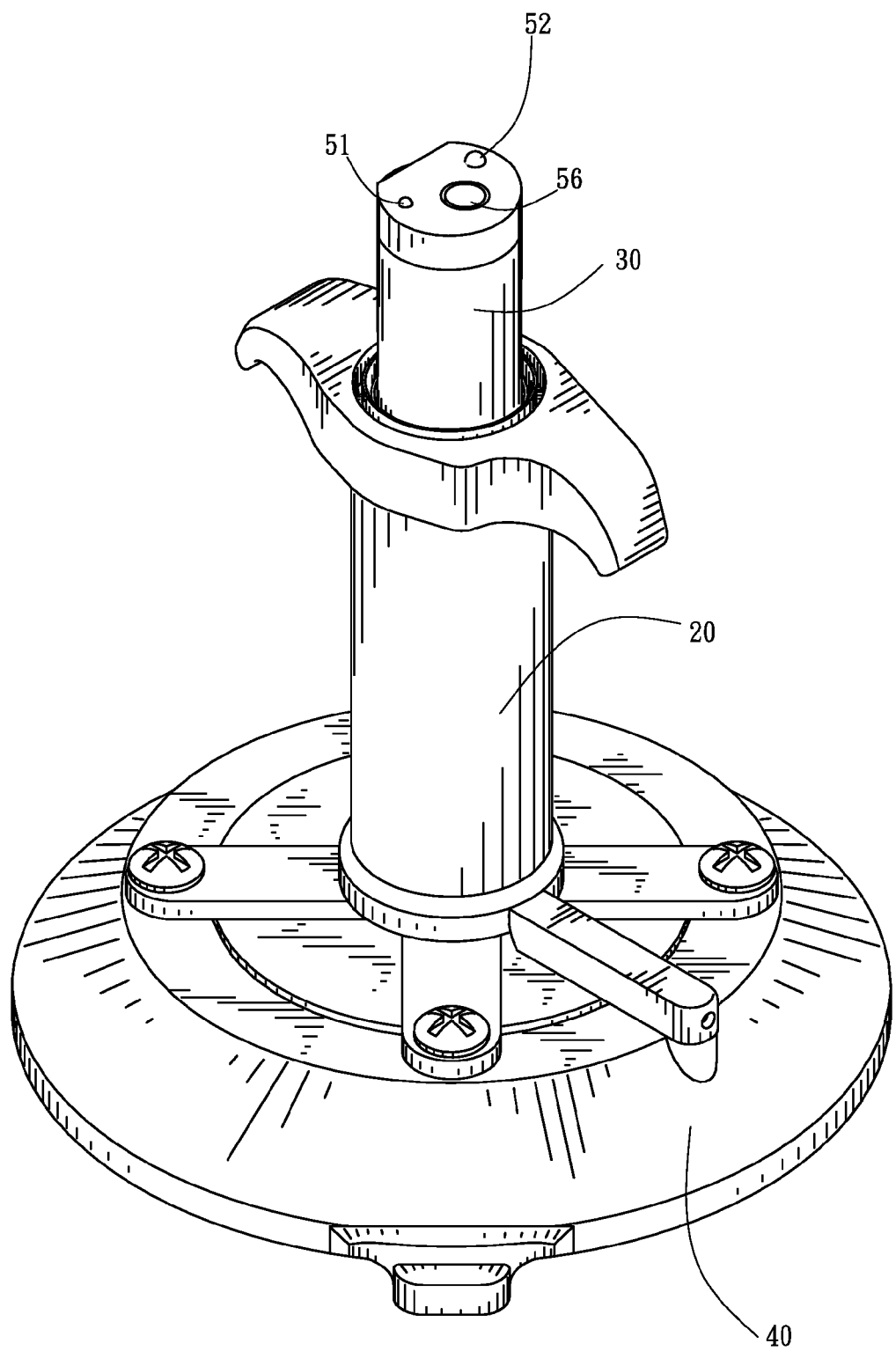
FIG. 10 is a perspective view illustrating the suction cup that contains the pumping device integrated with the alert device in accordance with a further embodiment of the present invention.

In the embodiment illustrated in FIGS. 7 and 8, the alert device 50 of the present invention is embodied in a "horizontal" type plunger for a suction cup, wherein the axial direction of the plunger is substantially parallel to a surface to which the suction cup is attached. The alert device 50 of the present invention may also be applied to a "vertical" type plunger as illustrated in FIGS. 9 and 10 that show two different embodiments of the present invention, wherein the plunger, also designated with reference numeral 30 for simplicity, has an axial direction that is substantially normal to a surface to which the suction cup 40 that is equipped with the plunger 30 is attached. Since the construction and operation of the "vertical" plunger 30 are exactly identical to those of the "horizontal" plunger 30, except the relative orientation thereof with respect to the suction cup 40 to which the plunger 30 is mounted, description of the "vertical" plunger 30 is not necessary and is thus omitted herein.

To this point, it is clear that the present invention offers the following advantages:

(1) An automatic alert device for a suction cup is provided, which allows a user not to keep an eye on the conventionally used red line mark once the suction cup reaches a desired vacuum level and which, upon excessive reduction of the suction force of the suction cup, generates warnings of light and sound to immediately notify an operator to timely re-operate the plunger to get the suction force back to the desired level.

(2) The alert device of the present invention employs an actuation bar to operate the alert device for generation warnings of light and sound at the time when an event of excessive reduction of suction force of the suction cup occurs so that the operator does not need to keep an eye on the alert device and operation safety and convenience can be enhanced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A suction device comprising:
   a suction cup positionable on a surface of an object to be handled;
   a pump comprising a cylinder mounted to the suction cup and in communication with the suction cup and a plunger received in the cylinder, the pump being operable to cause the suction cup to induce suction force acting on the surface of the object, the plunger comprising:
      an alert device mounted to an outer end of the plunger,
      a hollow barrel forming an opposite inner end of the plunger and received in the cylinder, the barrel receiving therein a rod and a first resilient element, the rod having a first end slidably extending through the inner end of the barrel and a washer seat fixed to the inner end of the barrel and fixed to a carrier that carries a rubber block and an opposite second end serving as the outer end of the plunger and carrying the alert device, the first resilient element being retained between the inner end of the barrel and the second end of the rod, and
      an actuation bar movably extending through the barrel and having a distal end normally engageable with a sensor of the alert device and an opposite proximate end extending through the inner end of the barrel and a second resilient element that is received in a step-like through hole defined in the washer seat and coupled with a clip ring engageable with the carrier and then movably fit into a hole defined in the carrier; and
   the alert device comprising an indicator, a warning light, and an audio alert, which are exposed for generation of warnings and a power source that supplies power to the alert device, wherein when the suction force induced by the suction cup is reduced by a predetermined level, the actuation bar is moved to actuate the sensor thereby activating the warning light and the audio alert to generate the warnings.

2. The suction device as claimed in claim 1, wherein the first resilient element comprises a spring.

3. The suction device as claimed in claim 1, wherein the pump is horizontally arranged.

4. The suction device as claimed in claim 1, wherein the pump is vertically arranged.

5. The suction device as claimed in claim 1, wherein the pump comprises a device that expels air out of the suction cup.

* * * * *